United States Patent [19]

Miller et al.

[11] Patent Number: 4,470,259
[45] Date of Patent: Sep. 11, 1984

[54] CLOSED CENTER, LOAD SENSING HYDRAULIC SYSTEM

[75] Inventors: James A. Miller, Cedar Falls; Derek M. Eagles, Hudson, both of Iowa

[73] Assignee: Deere & Company, Moline, Ill.

[21] Appl. No.: 524,802

[22] Filed: Aug. 11, 1983

[51] Int. Cl.³ .................... F16D 31/00; B62D 5/08
[52] U.S. Cl. .................................. 60/422; 60/384; 60/427; 91/518; 137/596; 180/132
[58] Field of Search .................. 60/422, 384, 385, 387, 60/420, 427; 91/514, 516, 517, 518; 180/132; 137/596, 596.13

[56] References Cited

U.S. PATENT DOCUMENTS

| | | | |
|---|---|---|---|
| 2,892,311 | 6/1959 | Van Gerpen | 60/52 |
| 2,892,312 | 6/1959 | Allen et al. | 60/52 |
| 3,750,405 | 8/1973 | Lech et al. | 60/422 |
| 4,034,563 | 7/1977 | Orth | 60/422 |
| 4,044,786 | 8/1977 | Yip | 137/101 |
| 4,116,001 | 9/1978 | Orth | 60/420 |
| 4,292,805 | 10/1981 | Acheson | 60/450 |
| 4,293,284 | 10/1981 | Carlson | 417/218 |
| 4,337,620 | 7/1982 | Johnson | 60/422 |
| 4,343,151 | 8/1982 | Lorimor | 91/516 |
| 4,345,614 | 8/1982 | Karlberg et al. | 60/384 |

Primary Examiner—Robert E. Garrett
Assistant Examiner—H. Edward Li

[57] ABSTRACT

A closed center, load sensing hydraulic system is disclosed which contains a primary work circuit which has priority in flow demand over a secondary work circuit. The system includes a variable displacement pump fluidly connected between a reservoir and a control valve with the primary work circuit. The primary work circuit includes a control valve which regulates fluid flow from the pump to a primary hydraulic function and which includes a feedback mechanism connected thereto. The secondary work circuit also includes a manually operable control valve for regulating fluid flow from the pump to a secondary hydraulic function. A priority valve is connected between the pump and the secondary work circuit and movable between an open and a closed position to regulate the pressure of fluid discharged by the pump. Pressurized fluid from the primary work circuit is conveyed through a load signal line to the priority valve such that the pressurized fluid will urge the priority valve towards a closed position thereby assuring that adequate fluid pressure is available from the pump to the primary work circuit. The system also includes a control valve for sensing pressure variations between the fluid discharged from the pump and fluid present in the load signal line. This valve controls fluid flow out of the primary hydraulic function, via the load signal line, when the pressure of the fluid discharged by the pump is less than the pressure of the fluid in the load signal line and thereby essentially eliminates kickback from the primary control valve.

11 Claims, 2 Drawing Figures

CLOSED CENTER, LOAD SENSING HYDRAULIC SYSTEM

FIELD OF THE INVENTION

This invention relates to a closed center, load sensing hydraulic system and more particularly, to a pressure compensated system which eliminates kickback from a feedback mechanism contained in a control valve which is fluidly connected to a hydraulic function.

BACKGROUND OF THE INVENTION

Currently, some agricultural and industrial equipment manufacturers design and construct vehicles which utilize closed center hydraulic systems with a load sensing priority function such as steering. Such systems can experience a kickback problem in the steering control valve as pressure fluctuations occur within the system. Such kickbacks can become very annoying to the operator during operation of the vehicle. Most systems currently available do not alleviate the kickback problem and those that attempt to do so have proven to be complicated in construction and costly to produce. Now, a closed center, load sensing hydraulic system has been invented which will essentially eliminate kickback on the steering wheel.

SUMMARY OF THE INVENTION

Briefly, this invention relates to a closed center, load sensing hydraulic system which assures that a primary work circuit has priority in flow demand over a secondary work circuit. The system includes a pressure compensated, variable displacement pump fluidly connected between a reservoir and the control valve of the primary work circuit. A priority valve is connected downstream of the pump and is movable to regulate fluid pressure from the pump to the primary work circuit. The secondary work circuit is also fluidly connected to the priority valve and includes a manually operable control valve for regulating fluid flow thereto. A load signal line is connected between the control valve of the primary work circuit and the priority valve for transmitting pressure signals thereto which control the movement of the priority valve. The system further includes a valve for sensing pressure variations between fluid discharged by the pump and fluid present in the load signal line. This valve blocks fluid flow out of the primary work circuit, via the load signal line, when the pressure of the fluid discharged by the pump is less than the pressure of the fluid in the load signal line and this essentially eliminates kickback from the primary control valve.

The general object of this invention is to provide a closed center, load sensing hydraulic system which assures that a primary work circuit has priority in flow demand over a secondary work circuit. A more specific object of this invention is to provide a closed center, load sensing hydraulic system which eliminates kickback from a feedback mechanism contained in a manually operable control valve fluidly connected to a primary hydraulic function.

Another object of this invention is to provide a simple and economical closed center hydraulic system.

Still further, an object of this invention is to provide a closed center, pressure compensated hydraulic system wherein kickback is eliminated from the steering wheel of a vehicle.

Other objects and advantages of the present invention will become more apparent to those skilled in the art in view of the following description and the accompanying drawings.

DETAILED DESCRIPTION OF THE PREFERRED EMBODIMENTS

Figure 1:
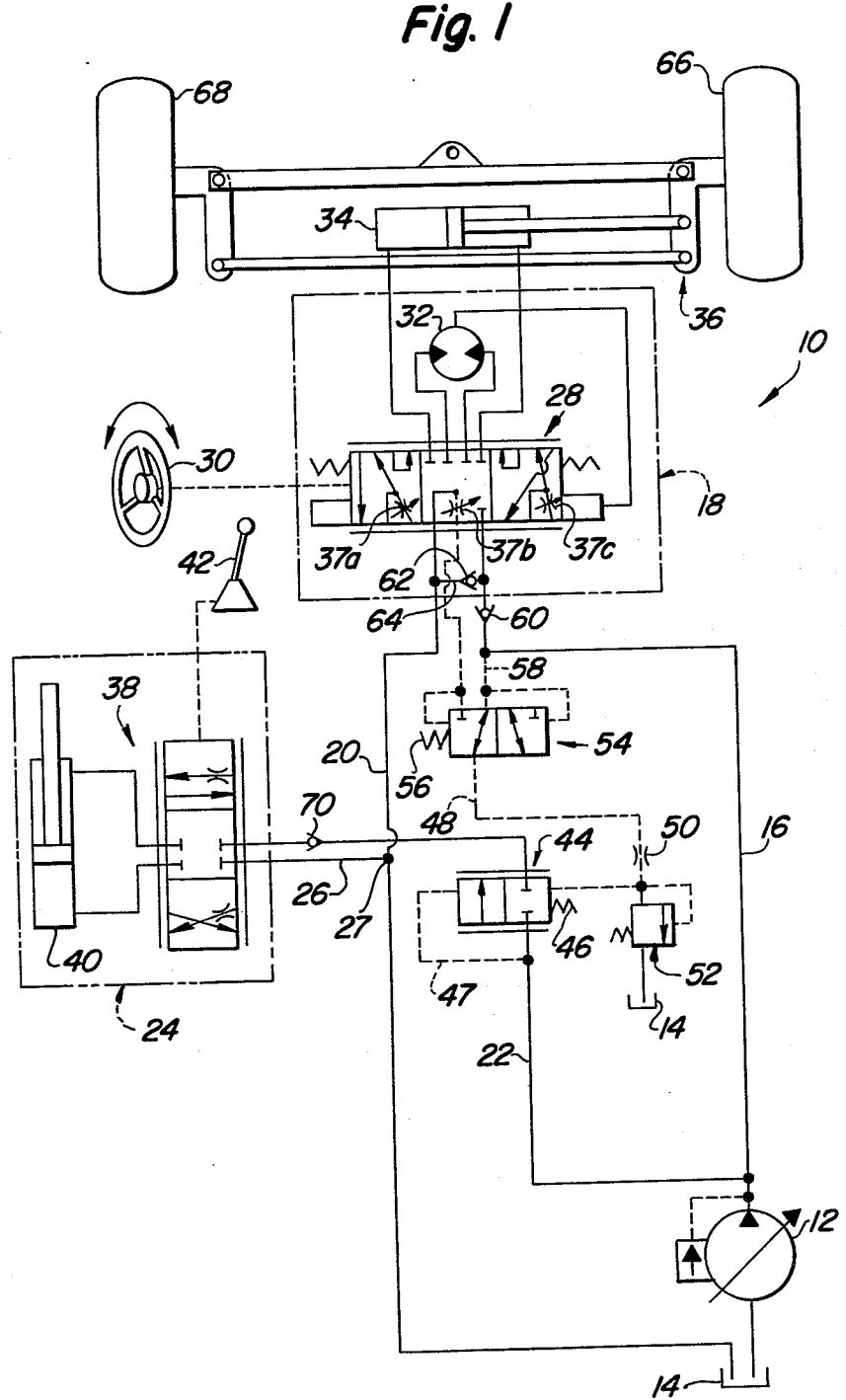
FIG. 1 is a schematic diagram of a closed center, load sensing hydraulic system using a priority valve movable between an open and a closed position.

Referring to FIG. 1, a closed center, load sensing hydraulic system 10 is shown which controls the steering of a vehicle, for example, an agricultural or industrial tractor. The system 10 includes a pressure compensated, variable displacement pump 12 which is fluidly connected to a reservoir 14. The pressure compensated pump 12 supplies pressurized fluid through a first supply line 16 to a primary work circuit 18. The primary work circuit 18 is in turn connected to the reservoir 14 by a return line 20. The pump is also connected by a second supply line 22 to a secondary work circuit 24 which in turn is connected by a return line 26 to the reservoir 14. For the sake of simplicity, lines 20 and 26 are joined together at point 27 to form a single line to the reservoir 14, although two separate lines could be used if desired.

The closed center, load sensing hydraulic system is designed such that the primary work circuit 18 has priority over the secondary work circuit 24. Although as depicted, the primary work circuit 18 is a steering circuit, other hydraulic circuits would be utilized as the primary circuit. As shown, the primary work circuit 18 includes a steering valve 28 which is movably actuated by a manually operable steering wheel 30 and by a fluidly activated gerotor 32. The fluid output of the steering valve 28 is directed to the ends of a hydraulic cylinder 34 so as to control the movement of a steering linkage 36. The physical construction and connection of the steering valve 28 to the gerotor 32 and to the hydraulic cylinder 34 are all wellknown to those skilled in the art. It should be noted, however, that the steering valve 28 is shown as being a three-position valve having three distinct orifices 37a, b, and c, for metering fluid flow therethrough.

The secondary work circuit 24 also contains a hydraulic valve 38 which is fluidly connected to the ends of a hydraulic cylinder 40. The hydraulic cylinder 40 can be used in numerous applications, for example, the raising or lowering of an implement which is attached to the vehicle. Preferably, the hydraulic valve 38 is mechanically activated by a lever mechanism 42.

A priority valve 44 is positioned across the second supply line 22 and is movable between an open and a closed position so that when needed it can control fluid pressure to the primary work circuit 18 by restricting the flow of fluid from the pump 12 to the secondary work circuit 24. Preferably, the priority valve 44 is biased by a spring 46 towards a closed position, wherein fluid flow through the second supply line 22 is restricted or blocked. The priority valve 44 is movable by the fluid pressure in the second supply line 22, via pilot line 47 to an open position wherein fluid is allowed to flow to the secondary valve 38.

The closed center hydraulic system 10 also includes a load signal line 48 fluidly connected between the primary work circuit 18 and the priority valve 44. The load signal line 48 is capable of transmitting pressure signals, which are generated by loads acting on the hydraulic cylinder 34, to the priority valve 44. As can be seen in FIG. 1, the load signal line 48 directs fluid to the right-hand end of the priority valve 44 and cooperates with the spring 46 to urge the priority valve 44 towards its closed position. As the fluid pressure builds within the load signal line 48, the priority valve 44 will be moved leftwards towards its closed position and a restriction will form in the second supply line 22. This restriction will cause the pressure in both the second supply line 22 up to the priority valve 44 and in the first supply line 16 to increase. Therefore, it should be understood that the pressurized fluid in the load signal line 48, along with the spring 46, cooperates with the pump 12 to restrict fluid flow to the secondary work circuit 24 and thereby regulates fluid pressure to the primary work circuit 18. This assures that adequate fluid flow and pressure is available from the pump 12 to the primary work circuit 18.

An orifice 50 is positioned across the load signal line 48 to meter flow therethrough and a relief valve 52 is arranged downstream of the orifice 50 and in a parallel relationship to the priority valve 44. The relief valve 52 is spring biased to a closed position and is fluid activated by the pressure in the load signal line 48 so as to open and relieve pressurized fluid from the load signal line 48 when the pressure exceeds a predetermined value. The excess fluid is returned to the reservoir 14 so that it can be used again.

In such a priority load sensing steering system, when a combination of a reverse pressure difference across and a reverse flow through the gerotor occurs, a torque develops which causes the steering valve 28 to rotate in a direction opposite to the direction in which the operator has turned the steering wheel 30. This opposite rotation in the steering valve 28 causes a kickback of the steering wheel 30 and this is undesirable. The present closed center hydraulic system 10 eliminates this kickback by using a load signal control valve 54 which is located across the load signal line 48 between the primary work circuit 18 and the priority valve 44. The load signal control valve 54 is preferably a three-way, two-position valve which is biased both by a spring 56 and by fluid pressure in the load signal line 48 to a first position (as shown) wherein the first supply line 16 is fluidly connected by a line 58 to the load signal line 48. The control valve 54 is movable leftward to a second position by fluid pressure in the first supply line 16, via line 58, which acts on the right end of the valve 54. In the second position, the steering valve 28 is fluidly connected by the load signal line 48 to the priority valve 44.

The load signal control valve 54 is capable of sensing pressure variations between the fluid and the first supply line 16 and the fluid in the load signal line 48. The valve 54 is movable relative to such pressure variations and will prevent fluid flow out of the primary work circuit 18, via the load signal line 48, when the fluid pressure in the first supply line 16 is less than the fluid pressure in the load signal line 48. By preventing fluid flow out of the steering valve 28, one eliminates the fluid flow path for reverse fluid flow through the gerotor 32 and thereby eliminates an opposite force from acting on the steering valve 28 which would cause the steering wheel 30 to kick back.

The closed center, load sensing hydraulic system 10 further includes a one-way check valve 60 positioned in the first supply line 16 between the point where the control valve 54 is connected to the first supply line 16 and a point where the first supply line 16 is connected to the steering valve 28. This check valve 60 prevents the reverse flow of fluid out of the primary work circuit to the first supply line 16. A second one-way check valve 62 is positioned in a line 64 which connects the return line 20 to the first supply line 16. This check valve 62 permits fluid flow from the return line 20 to the first supply line 16 should the operator's input to the steering wheel 30 be greater than the fluid flow available from the pump 12. When this occurs, flow normally routed back to the reservoir 14 is used to fill the first supply line 16 and thereby prevents the first supply line 16 from cavitating.

The closed center hydraulic system 10 also includes right and left wheels 66 and 68 which are mounted on the linkage 36. Also, it has a lift check valve 70 positioned across the second supply line 22. The lift check valve 70 prevents the reverse flow of fluid out of the secondary control valve 38.

Figure 2:
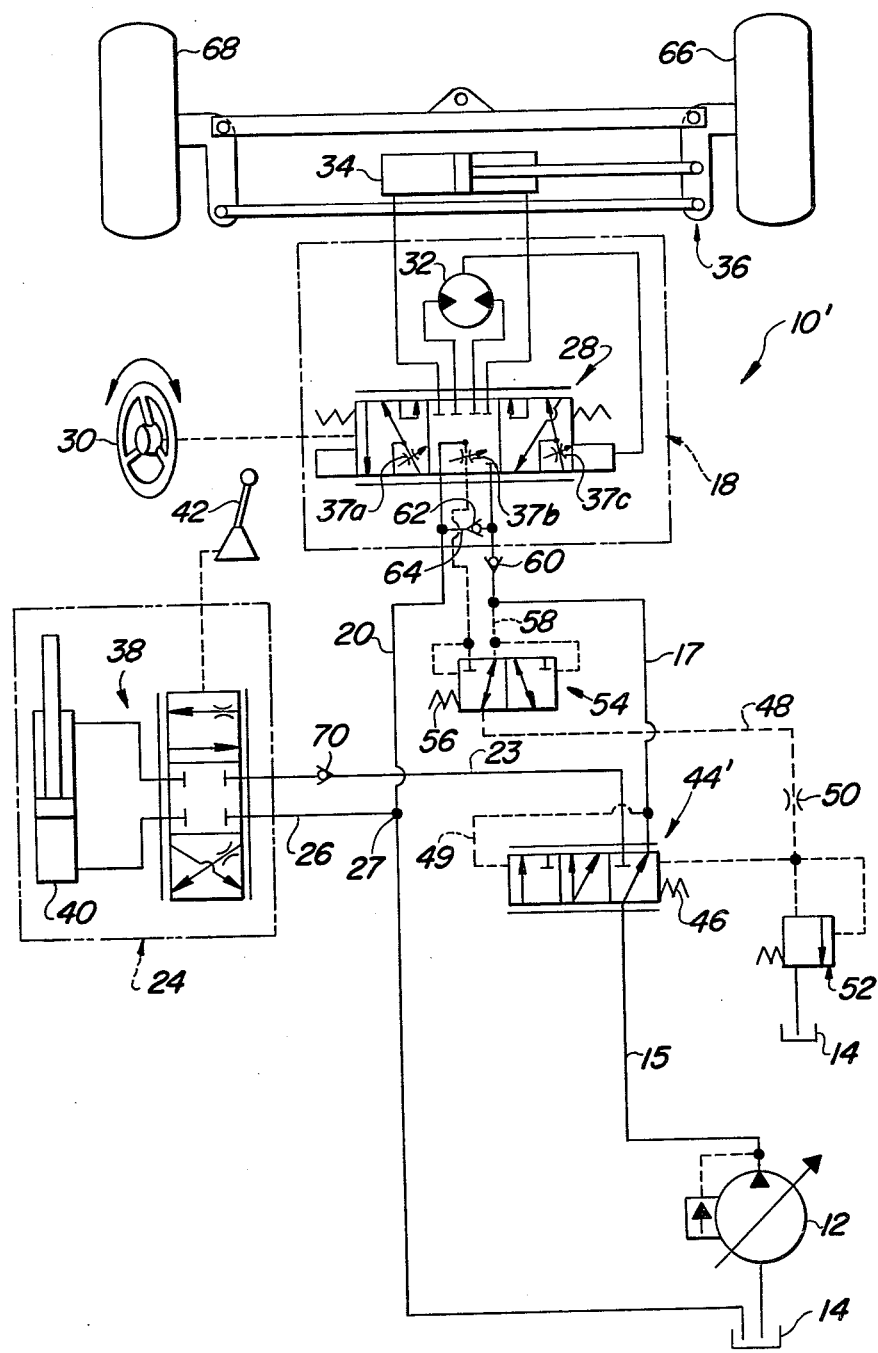
FIG. 2 is a schematic diagram of an alternative embodiment of a closed center, load sensing hydraulic system using a three-way, three-position priority valve.

Referring to FIG. 2, an alternative embodiment is shown wherein the closed center, load sensing hydraulic system 10' uses a priority valve 44' which is positioned between the pump 12 and both the primary and secondary work circuits 18 and 24, respectively. For the sake of simplicity, FIG. 2 will be described using the same numerals for like elements as were used in FIG. 1. Pressurized fluid from the pump 12 is routed through a supply line 15, through the priority valve 44', and through a supply line 17 to the primary work circuit 18. Pressurized fluid can be directed by the priority valve 44' through a supply line 23 to the secondary work circuit 24. The supply line 23 also has the lift check valve 70 positioned across it to prevent reverse flow of fluid out of the secondary work circuit 24. The only other noticeable difference between the Figures is that a pilot line 49 connects the supply line 17 to the left-hand end of the priority valve 44'. The operation of the priority valve 44', which is preferably a three-way, three-position valve, will be explained below.

OPERATION OF FIRST EMBODIMENT

The operation of the closed center hydraulic system 10 will now be explained using various pressure values which are assigned to trigger the movement of certain valves in order to acquaint the reader with the system. It should be understood that the invention is not limited to these hypothetical values.

Starting from a condition wherein the engine of the vehicle is not running, the pump 12 will not be operating. At this time, the steering valve 28 will be in its neutral position, the hydraulic cylinder 34 is depressurized, the priority valve 44 will be closed and the control valve 54 will be in its first position, all of which are indicated in FIG. 1. As soon as the operator starts the engine, the pump 12 will route pressurized fluid through the first supply line 16 towards the steering valve 28 and through the second supply line 22 towards the priority valve 44. Since the steering valve 28 is in its neutral position, fluid flow through the steering valve 28 will be blocked and the fluid pressure will rise within the first supply line 16. As the pressure rises and reaches about 50 psi, which represents the force needed to compress the spring 56, the control valve 54 will shift leftward to a second position. In the second position, the control valve 54 blocks the flow of pressurized fluid from the first supply line 16 to the load signal line 48 and permits the fluid in the load signal line 48 to be connected to the reservoir 14 via the orifice 37b and the return line 20. As the pressure discharged from the pump 12 builds to about 150 psi, this pressure will be conveyed through both the second supply line 22 and the pilot line 47 to the left-hand end of the priority valve 44 and it will cause the priority valve 44 to move rightwards towards its open position against the force of the spring 46. It should be noted that a pressure of about 150 psi on the left end of the priority valve 44 is required to overcome the force of the spring 46. With the priority valve 44 in its open position, fluid is routed to the control valve 38 of the secondary work circuit 24. Since the control valve 38 is in its neutral position, fluid flow therethrough will be blocked. The pressure discharged from the pump 12 will continue to increase, until it reaches the setting of the pressure compensator, to a standby condition of approximately 2300 psi.

NORMAL STEER OPERATION FOR THE FIRST EMBODIMENT

The closed centered hydraulic system 10 will function as follows when fluid is required by the primary work circuit 18 while the hydraulic valve 38 of the secondary work circuit 24 is in its neutral position. Starting from the standby position wherein the control valve 54 is in its second position and the priority valve 44 has moved towards its open position, fluid flow from the pump 12 will be directed through the first and second supply lines 16 and 22, respectively, towards the primary and secondary work circuits 18 and 24. At this time, the operator may initiate a right turn by turning the steering wheel 30 rightwards. By turning the steering wheel 30 rightwards, the steering valve 28 is moved rightward such that the first supply line 16 is fluidly connected through the orifice 37a to the left-hand side of the gerotor 32. The right-hand side of the gerotor 32 is fluidly connected to the rod end of the hydraulic cylinder 34 and the head end of the hydraulic cylinder 34 is fluidly connected by the return line 20 to the reservoir 14.

Assuming that the pressure needed to move the piston within the hydraulic cylinder 34 is 900 psi, and that the pressure from the pump is at the 2300 psi standby pressure, as soon as the steering valve 28 is moved rightwards, fluid in the first conduit 16 will be directed through the orifice 37a to both the steering cylinder 34 and to the load signal line 48. This 900 psi pressure in the load signal line 48, together with the force of the spring 56, will act on the control valve 54 attempting to move it back to its first position. This force, however, will be insufficient to overcome the force of the fluid pressure in the first supply line 16, which is being maintained at 2300 psi by the pressure compensated pump 12 and which is acting on the control valve 54 to hold it in its second position. The 900 psi pressure will be directed through the load signal line 48 to the right-hand end of the priority valve 44. This fluid pressure acting on the right-hand side of the priority valve 44, together with the force of the spring 46, will attempt to move the priority valve 44 towards its closed position. However, this force will be insufficient to overcome the force of the fluid pressure on the pilot line 47 acting on the priority valve 44 to hold it on its second position. Neither the control valve 54 nor the priority valve 44 will move in this operation.

Once the operator stops turning the steering wheel 30, the primary control valve 28 will move to its neutral position. The fluid in the load signal line 48 will drain back through the orifice 37b and the return line 20 to the reservoir 14. When this happens, the pressure in the load signal line 48 will drop to essentially zero and the system will return to its standby condition.

STEERING WITH THE SECONDARY CIRCUIT USING FULL PUMP FLOW AT A RELATIVELY LOW PRESSURE

Should a situation arise wherein the secondary work circuit 24 is using the maximum pump flow at a pressure of approximately 500 psi and the operator wishes to turn the steering wheel 30, the following would occur. Starting with a condition wherein the priority valve 44 is open and the control valve 54 is in its second position and with the pump operating at maximum stroke and constant flow, the operator turns the steering wheel rightwards. This action causes the primary control valve 28 to shift rightward such that the 500 psi present in the first supply line 16 is connected through the orifice 37a to the load signal line 48. The 500 psi pressure in the load signal line 48, along with the force of the spring 56, will move the control valve 54 to its first position, as shown. Fluid from the first supply line 16 will now be directed through the load signal line 48 to the right-hand side of the priority valve 44 and will cause the priority valve 44 to move leftwards towards its closed position thereby restricting flow to the secondary work circuit 24. As the priority valve 44 moves towards its closed position, the pressure in the supply lines 16 and 22, up to the priority valve 44, increases. When this pressure reaches 900 psi fluid flow begins to pass through the orifice 37a to move the hydraulic cylinder 34 and steer the wheels 66 and 68. When the pressure reaches 950 psi, there will be a 50 psi pressure drop across the orifice 37a and the pressure in the lines 16 and 58 will overcome the pressure in the load signal line 48, on the primary circuit side of the control valve 54, and the spring 56 so that the control valve 54 will shift to its second position. As the priority valve 44 continues to move towards its closed position, the pressure in the supply lines 16 and 22, up to the priority valve 44, will continue to increase. When this pressure reaches 1050 psi, there will be a 150 psi pressure drop across orifice 37a. The 900 psi load signal pressure and the force of the spring 46 will not be able to continue to move the priority valve 44 against the 1050 psi pressure in the pilot line 47. The priority valve 44 will stop moving, the restriction on the flow to the secondary circuit will be constant and therefore the pressure in the lines 16 and 22, up to the priority valve 44, will be constant.

This action assures that adequate pressure is now available through the first supply line 16 to the hydraulic cylinder 34 so as to steer the vehicle. As soon as the operator stops turning the steering wheel 30, the primary control valve 28 will move back to its neutral position to block further flow through the first supply line 16 and permit the fluid from the load signal line 48 to drain to the reservoir 14 via the orifice 37b and the return line 20. With the pressurized force acting on the right-hand side of the priority valve 44 at essentially zero pressure, the pressure in the pilot line 47 will move the priority valve 44 rightwards to its open position thereby establishing full flow to the secondary work circuit 24.

Should a situation arise where the pressure in the hydraulic cylinder 34 is higher than the 900 psi in the supply line 16, for example, when the wheels 66 and 68 are in a rut or up against a curb, and the secondary work circuit 24 is taking the maximum pump flow at 500 psi, the following would occur as the operator turns the steering wheel 30 rightward. The control valve 28 would move rightward and the higher pressure in the rod end of the cylinder 34 would be directed through the load signal line 48 to the control valve 54. This higher pressure causes the control valve 54 to move to its first position, as shown, and blocks further flow out of the cylinder 34 thereby preventing a kickback on the steering wheel 30.

OPERATION OF SECOND EMBODIMENT

As explained above, the operation will be discussed using various pressure values which are assigned to trigger the movement of certain valves. The invention is not to be limited by these hypothetical values.

Starting from a condition wherein the engine of the vehicle is not running, the pump 12 will not be operating. At this time, the steering valve 28 will be in its neutral position, the hydraulic cylinder 34 is depressurized, the priority valve 44 in a first position wherein all of the fluid flow will be directed to the supply line 17 and the control valve 54 will be in its first position, all of which are indicated in FIG. 2. As soon as the operator starts the engine, the pump will route pressurized fluid through the supply lines 15 and 17 towards the primary control valve 28 and this pressure will be transferred through the line 58 to cause the control valve 54 to shift to its second position. Since the primary control valve 28 is in its neutral position, fluid flow into this valve is blocked and the load signal line 48 is drained to the reservoir 14 via the orifice 37b and the return line 20. When the pressure in the lines 15, 17 and 49 reaches 150 psi, the priority valve 44' moves first to the second position directing pressurized fluid to the secondary work circuit 24 and continues to move to the third position, blocking pressurized fluid from the line 17. The fluid pressure within the system will then rise to 2300 psi which represents the standby condition for the system.

NORMAL STEER OPERATION FOR THE SECOND EMBODIMENT

Starting from the standby position, should the operator turn the steering wheel 30 to the right, the primary control valve 28 will move rightwards such that the orifice 37a is aligned with the supply line 17. This will permit pressurized fluid to flow into the load signal line 48 and move the control valve 54 to its first position, as shown. Such action allows the pressurized fluid in the supply line 17 to be directed through the load signal control line 48 to the right-hand end of the priority valve 44'. The priority valve 44' will move away from its third position so as to meter pressurized fluid into the line 17. When the pressure in the supply line 17 reaches 900 psi, representing the cylinder load, flow through the orifice 37a will begin steering the wheels 66 and 68. When the pressure in the supply line 17 reaches 950 psi, the control valve 54 will move to its second position, connecting the 900 psi load signal pressure to the priority valve 44'. The priority valve 44' will modulate to maintain the pressure in the supply line 17 at 1050 psi which represents the 900 psi load signal pressure in the load signal line 48 plus the 150 psi represented by the spring 46. This assures that full flow from the pump 12 will be directed to the primary work circuit 18.

Once the operator stops turning the steering wheel 30, the primary control valve 28 will return to its neutral position, the fluid in the load signal line 48 will drain via the return line 20 to the reservoir 14 and standby is reestablished.

STEERING WITH SECONDARY CIRCUIT USING FULL PUMP FLOW AT A RELATIVELY LOW PRESSURE

Should a situation arise wherein the secondary work circuit 24 is using the maximum pump flow at a pressure of approximately 500 psi, the system would operate as follows. Starting from a position wherein the priority valve 44' is in its third position and the flow from the pump 12 is directed to the secondary work circuit 24, the operator begins to turn the steering wheel 30 rightwards which causes the primary control valve 28 to move rightwards. This action will cause the control valve 54 to move to its first position and the pressurized fluid in the supply line 17 will be directed into the load signal line 48 to the right-hand end of the priority valve 44'. This pressurized fluid will offset the force of the pressurized fluid in the pilot line 49 and the priority valve 44' will move leftward towards its first position thereby restricting the flow going to the secondary work circuit 24. This action will also increase the pressure in the supply line 15.

As mentioned above, when the pressure in the supply line 17 reaches 900 psi, fluid flow to the hydraulic cylinder 34 will begin. Once the pressure reaches approximately 950 psi, the control valve 54 will shift to its second position and fluid in the supply line 17 will be directed to the priority valve 44' via the lines 58 and 48. The priority valve 44' will continue to move leftward, due to the force of the pressurized fluid, until the pressure discharged by the pump 12 reaches 1050 psi. When this occurs, the priority valve 44' will stop moving. Once the operator stops turning the steering wheel 30, the primary control valve 28 will move back to its neutral position thereby allowing the fluid in the load signal line 48 to drain to the reservoir 14 via the return line 20. This action will reduce the force on the right-hand side of the priority valve 44' and the priority valve 44' will move rightwards thereby routing the majority of the flow to the secondary work circuit 24.

Should a situation arise where an external load creates a force on the hydraulic cylinder 34 which is higher than the 900 psi pressure in the supply line 17, and the secondary work circuit 24 is taking the maximum pump flow at 500 psi, the following would occur as the operator turns the steering wheel 30 rightward. The control valve 28 would move rightward and the higher pressure in the rod end of the cylinder 34 would be directed through the load signal line 48 to the control valve 54. This higher pressure causes the control valve 54 to move to its first position, as shown, and blocks further flow out of the cylinder 34 thereby preventing a kickback on the steering wheel 30.

It should be noted that the priority valve 44' is a three-way, three-position valve which is denoted as a metering valve. This means that between the first and second positions, as shown in FIG. 2, most of the flow is directed to the primary work circuit 18 with a small amount being directed through the line 23 to the secondary work circuit 24.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A closed center, load sensing hydraulic system comprising:
   (a) a reservoir capable of holding a quantity of fluid;
   (b) a pump fluidly connected to said reservoir;
   (c) a primary work circuit fluidly connected to said pump, said primary work circuit including a control valve with a feedback mechanism connected thereto, said control valve regulating fluid flow from said pump to a primary hydraulic function;
   (d) a secondary work circuit fluidly connected to said pump, said secondary work circuit including a manually operable control valve for regulating fluid flow from said pump to a secondary hydraulic function;
   (e) a priority valve connected downstream of said pump and being movable to regulate fluid pressure from said pump to said primary work circuit;
   (f) a load signal line connecting said control valve of said primary work circuit to said priority valve, said load signal line being capable of transmitting pressure signals to said priority valve to control movement thereof, thereby assuring that adequate fluid pressure is available from said pump to said primary work circuit; and
   (g) means for sensing pressure variations between fluid routed to said primary work circuit and fluid present in said load signal line, said means being movable relative to such pressure variations to prevent fluid flow out of said primary work circuit, via said load signal line, when the pressure of said fluid routed to said primary work circuit is less than the pressure of said fluid in said load signal line thereby essentially eliminating kickback from said primary control valve.

2. The closed center, load sensing hydraulic system of claim 1 wherein said means is a three-way, two-position valve.

3. The closed center, load sensing hydraulic system of claim 1 wherein said pump is a pressure compensated variable displacement pump.

4. A closed center, load sensing hydraulic system which essentially eliminates kickback from a feedback mechanism contained in a control valve fluidly connected to a primary hydraulic function, said system comprising:
   (a) a reservoir capable of holding a quantity of fluid;
   (b) a pressure compensated, variable displacement pump fluidly connected to said reservoir;
   (c) a priority valve connected downstream of said pump and being movable to regulate fluid pressure from said pump to said primary hydraulic function;
   (d) a secondary work circuit fluidly connected to said priority valve, said secondary work circuit including a manually operable control valve for regulating fluid flow from said priority valve to a secondary hydraulic function;
   (e) a load signal line connecting said control valve of said primary hydraulic function to said priority valve, said load signal line being capable of transmitting pressure signals to said priority valve to control movement thereof, thereby assuring that adequate fluid pressure is available from said pump to said primary hydraulic function; and
   (f) valve means for sensing pressure variations between fluid routed to said primary control valve and fluid present in said load signal line, said valve means being movable relative to such pressure variations to prevent fluid flow out of said primary control valve, via said load signal line, when the pressure of said fluid routed to said primary hydraulic function is less than the pressure of said fluid in said load signal line.

5. The closed center, load sensing hydraulic system of claim 4 wherein said valve means is a three-way, two-position valve.

6. A closed center, load sensing hydraulic system which assures that a primary work circuit has priority in flow demand over a secondary work circuit and which essentially eliminates kickback from a control valve with a feedback mechanism contained in said primary work circuit, said system comprising:
   (a) a reservoir capable of holding a quantity of fluid;
   (b) a pressure compensated, variable displacement pump fluidly connected to said reservoir;
   (c) first and second fluid conduits connecting said pump to said control valve and said control valve to said reservoir, respectively;
   (d) third and fourth fluid conduits connecting said pump to a hydraulic function contained in said secondary work circuit and said hydraulic function of said secondary work circuit to said reservoir, respectively;
   (e) a priority valve connected across said third conduit which is movable between an open and a closed position to control fluid pressure flow from said pump to said primary work circuit;
   (f) a load signal line connecting said control valve to a first end of said priority valve for transmitting pressure signals generated by loads acting on a primary hydraulic function to said priority valve to control movement thereof thereby assuring that adequate fluid pressure is available from said pump to said primary work circuit;
   (g) an orifice positioned across said load signal line for metering fluid flow therethrough;
   (h) a relief valve positioned downstream of said orifice and is parallel with said priority valve, said relief valve being set to relieve pressure above a predetermined value from said load signal line;
   (i) a pilot line connecting said third conduit upstream of said priority valve to a second end of said priority valve, fluid pressure in said pilot line urging said priority valve toward a position permitting fluid flow to said secondary work circuit; and
   (j) valve means for sensing pressure variations between fluid present in said first conduit and fluid present in said load signal line and being movable relative to such pressure variations to prevent fluid flow out of said primary work circuit, via said load signal line, when the pressure present in said first conduit is less than the pressure present in said load signal line.

7. The closed center, load sensing hydraulic system of claim 6 wherein said valve means is a three-way, two-position valve.

8. The closed center, load sensing hydraulic system of claim 6 wherein said priority valve is a two-way, two-position valve.

9. A closed center, load sensing hydraulic system which assures that a primary work circuit has priority in flow demand over a secondary work circuit and which essentially eliminates kickback from a control valve with a feedback mechanism contained in said primary work circuit, said system comprising:
  (a) a reservoir capable of holding a quantity of fluid;
  (b) a pressure compensated, variable displacement pump fluidly connected to said reservoir;
  (c) first and second fluid conduits connecting said pump to said control valve and said control valve to said reservoir, respectively;
  (d) a priority valve connected across said first conduit for regulating fluid pressure discharged by said pump;
  (e) third and fourth conduits connecting said priority valve to a hydraulic function contained in said secondary work circuit and said hydraulic function of said secondary work circuit to said reservoir, respectively;
  (f) a load signal line connecting said control valve to a first end of said priority valve for transmitting pressure signals generated by loads acting on a primary hydraulic function to said priority valve to control movement thereof, thereby assuring that adequate fluid pressure is available from said pump to said primary work circuit;
  (g) an orifice positioned across said load signal line for metering fluid flow therethrough;
  (h) a relief valve positioned downstream of said orifice and in parallel with said priority valve, said relief valve being set to relieve pressure above a predetermined value from said load signal line;
  (i) a pilot line connecting said first conduit downstream of said priority valve to a second end of said priority valves fluid pressure in said pilot line urging said priority valve toward a position permitting fluid flow to said secondary work circuit; and
  (j) valve means for sensing pressure variations between fluid present in said first conduit and fluid present in said load signal line and being movable relative to such pressure variations to prevent fluid flow out of said primary work circuit, via said load signal line, when the pressure present in said first conduit is less than the pressure present in said load signal line.

10. The closed center, load sensing hydraulic system of claim 9 wherein said valve means is a three-way, two-position valve.

11. The closed center, load sensing hydraulic system of claim 9 wherein said priority valve is a three-way, three-position valve.

* * * * *

UNITED STATES PATENT AND TRADEMARK OFFICE
CERTIFICATE OF CORRECTION

PATENT NO. : 4,470,259

DATED : 11 September 1984

INVENTOR(S) : James A. Miller and Derek M. Eagles

It is certified that error appears in the above-identified patent and that said Letters Patent is hereby corrected as shown below:

Column 11, line 19, after "fourth", insert -- fluid --.

Column 12, line 11, delete "valves" and insert -- valve --.

Signed and Sealed this

Twenty-sixth Day of March 1985

[SEAL]

Attest:

DONALD J. QUIGG

Attesting Officer

Acting Commissioner of Patents and Trademarks